United States Patent
Santa Cruz et al.

[11] Patent Number: 6,135,397
[45] Date of Patent: Oct. 24, 2000

[54] MULTIPURPOSE FASTENER

[76] Inventors: Cathy D. Santa Cruz, 7630 Throll Rd., Reno, Nev. 89502; Wayne R. Sandstrom, P.O. Box 549, Wadsworth, Nev. 89442

[21] Appl. No.: 09/172,928

[22] Filed: Oct. 14, 1998

Related U.S. Application Data

[60] Provisional application No. 60/061,868, Oct. 15, 1997.

[51] Int. Cl.⁷ .................................................. F16L 3/08
[52] U.S. Cl. .......................... 248/74.1; 248/58; 248/302
[58] Field of Search ................................ 248/58, 60, 62, 248/74.1, 74.3, 302, 317, 200.1, 55

[56] References Cited

U.S. PATENT DOCUMENTS

| | | | |
|---|---|---|---|
| 397,037 | 1/1889 | Steussy | 248/74.3 |
| 861,887 | 7/1907 | Peirce | 248/61 |
| 870,002 | 11/1907 | Williams | 248/61 |
| 2,373,328 | 6/1945 | Morehouse | 248/61 |
| 2,408,572 | 5/1946 | Morehouse | 248/74.3 |
| 2,636,703 | 6/1953 | Wallans | 248/58 |
| 2,744,707 | 5/1956 | Peterson | 248/61 |
| 3,139,253 | 6/1964 | Crawford, Jr. et al. | 248/74 |
| 3,159,708 | 12/1964 | Deal | 174/40 |
| 3,204,901 | 9/1965 | Dunn | 248/74 |
| 3,313,503 | 4/1967 | Mayr | 248/60 |
| 3,460,788 | 8/1969 | Goldman | 248/74 |
| 4,318,518 | 3/1982 | Davis | 248/60 |

FOREIGN PATENT DOCUMENTS 11-32421  2/1999  Japan .

*Primary Examiner*—Ramon O. Ramirez
*Assistant Examiner*—Walter Landry

[57] ABSTRACT

A multipurpose fastener comprising of either a wire, or metal stripping in combination with insulation, and a method of use is taught.

6 Claims, 3 Drawing Sheets

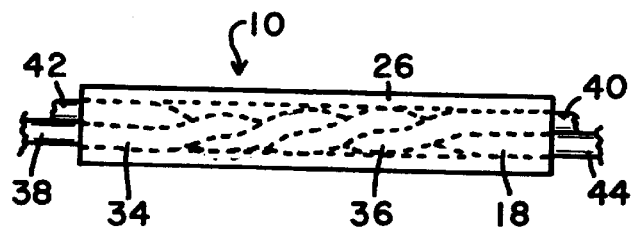
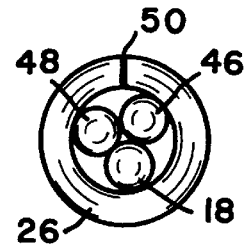
FIG. 5  FIG. 6
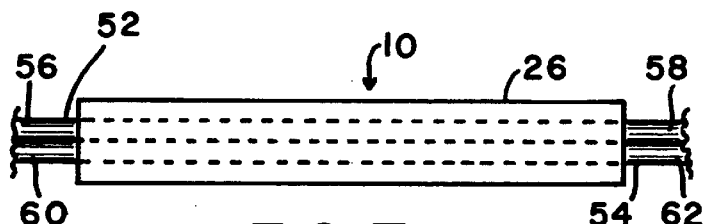
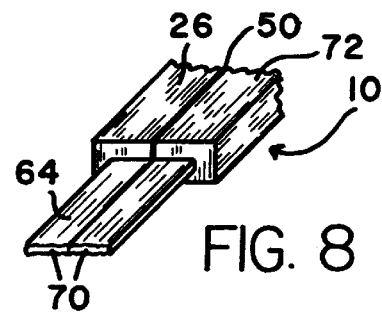
FIG. 7  FIG. 8
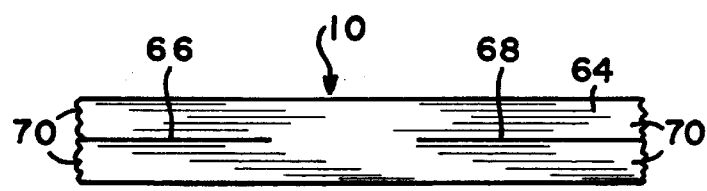
FIG. 9
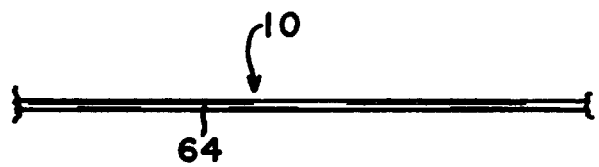
FIG. 10
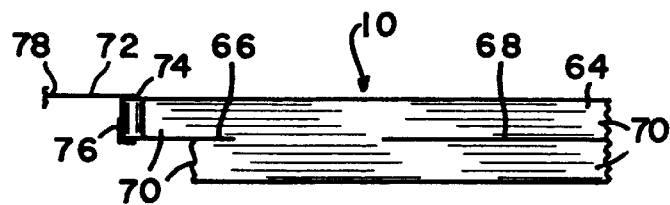
FIG. 11

MULTIPURPOSE FASTENER

It is to be noted this application is resultant from our provisional application No. 60/061868, filed on Oct. 15, 1997.

FIELD OF THE INVENTION

This invention relates to fasteners in general, but more particularly pertains to a fastener comprising of either a wire, or metal stripping in combination with insulation, and a method of use is disclosed.

BACKGROUND OF THE INVENTION

In the past, many different types of fasteners have been taught within the prior art. However, most fasteners are designed for a specific use and could not be used for multiple purposes, as can the present invention.

For example, U.S. Pat. Nos. 5,364,053, 4,979,715 and 3,859,770, are each specifically designed for supporting an acoustical ceiling from an overhead structure. They are each limited in strength, each require additional apparatus, such as a bracket or the like, and none are combined with insulation, as taught by the present invention.

Further examples are taught within U.S. Pat. Nos. 953, 951 and 5,553,822, each of which are specifically designed for supporting a cable or conduit from a support structure, and again no suggestion or reference is made to the use of either wire, or metal stripping in combination with insulation.

Therefore, nowhere in the prior art did the applicants find a fastener which can be made from either a wire, or metal stripping, which when combined with insulation, provides a multipurpose fastener having unusual results, such as taught by the present invention.

SUMMARY OF THE INVENTION

The present invention is substantially a multipurpose fastener which can be used to either vertically suspend or provide horizontal support, and attach an object to a support structure of choice. Therefore, the present fastener is most versatile, as it can be used to support substantially any object of choice. For example, it could be used as an isolator and fastener for attaching an electrical wire to a fence post, which is highly beneficial and efficient. Or the present fastener may be used to suspend or support plumbing from a support structure. Or the present fastener may be used to support conduit. Or still further, the present fastener can be used to support a hydronic radiant heat pipe, or the like.

Therefore, the present fastener is not limited to one specific use, but can be used to substantially provide support or suspend any object of choice from substantially any support structure of choice.

The preferred embodiment for the fastener can be easily formed from one continuous wire or one metal strip, with a portion of the wire or strip being positioned within an insulating removable member.

Other embodiments may include multiple interconnected wires, or multiple interconnected metal strips, or wires and metal strips combined, in combination with one or multiple insulating removable members, depending on engineering or user preferences.

However, each embodiment provides different results and distinct advantages as will later be seen.

It is therefore an object of the present invention to provide a multipurpose fastener which can be used to support or suspend, any object of choice from substantially any suitable support structure of choice.

It is a further object of the present invention to provide a multipurpose fastener which includes at least one continuous wire in combination with at least one insulating removable member.

It is a further object of the present invention to provide a multipurpose fastener which includes at least one continuous metal strip in combination with at least one insulating removable member.

Yet a further object of the present invention to provide a multipurpose fastener which includes multiple wires in combination with at least one insulating removable member.

Yet a further object of the present invention to provide a multipurpose fastener which includes multiple metal strips in combination with at least one insulating removable member.

Still a further object of the present invention to provide a multipurpose fastener which includes multiple wires in combination with multiple insulating removable members.

Still a further object of the present invention to provide a multipurpose fastener which includes multiple metal strips in combination with multiple insulating removable members.

Yet another object of the present invention is to provide a multipurpose fastener which may be formed from multiple interconnected metal strips, with the interconnected strips being removably positioned within an insulating member.

Furthermore, it is another object of the present invention to provide a multipurpose fastener which can be formed from substantially any suitable length or gauge of wire of choice, such as 16 gauge.

Furthermore, it is another object of the present invention to provide a multipurpose fastener which can be formed from substantially any suitable length or gauge of metal stripping of choice, such as 20 gauge.

Yet another object of the present invention is to provide a multipurpose fastener which includes an insulating removable member which is made from substantially any suitable non-metallic material of choice, such as rubber, neoprene, flexible plastic, etc.

Still a further object of the present invention is to provide a multipurpose fastener having an insulating removable member which is of any suitable length of choice and includes an inside diameter of substantially any suitable size of choice.

Yet another object of the present invention is to provide a multipurpose fastener which is formed from a wire and an insulating member, with the insulating member having any suitable means to be removably attached to the fastener. For example, the insulating member may be slidably engaged around the outside circumference of the wire, or the insulating member may include an elongated slit which is of a shape and size to slidably receive the wire there through, or any other suitable removable attachment means may be used.

Still a further object of the present invention is to provide a multipurpose fastener which has inherent advantageous characteristics, such as the fastener in combination with the insulating member provides additional strength, and reduces stress points on the object being fastened.

Further unique characteristics of the present multipurpose fastener include dielectric separation, sound attenuation, improved seismic bracing, reduced loading, reduced thermal transfer, etc.

Another object of the present invention is to provide a multipurpose fastener which is completely adjustable.

Still a further object of the present invention is to provide a multipurpose fastener which includes substantially any suitable means to attach the ends of the fastener to a support structure.

Other objects and advantages will be seen when taken into consideration with following specification and drawings.

BRIEF DESCRIPTION OF THE DRAWINGS

FIG. 5 is substantially a partial plan view for a third embodiment for the present invention.

FIG. 6 is substantially a partial end view for a forth embodiment for the present invention.

FIG. 7 is substantially a partial plan view of a fifth embodiment for the present invention.

FIG. 8 is substantially a partial perspective end view of a sixth embodiment.

FIG. 9 is substantially a top view of an elongated metal strip, as found within the sixth embodiment.

FIG. 10 is substantially a side view of FIG. 9.

FIG. 11 is substantially a top plan view of FIG. 9.

DETAILED DESCRIPTION OF THE DRAWINGS

Referring now in detail to the drawings wherein like numerals refer to like characters throughout the various views.

Within all of the various views, (arrow 10) represents an overview of the present invention, which is substantially a multipurpose fastener. It is to be noted that fastener (see arrow 10) is not limited to one specific use, and can be used to either provide support, or suspend, substantially any object of choice from substantially any support structure of choice. Therefore, throughout the views, whenever an object or support structure is named, it is to be understood this is only exemplary, and the fastener as taught herein is not to be limited to use with a specific support structure, or specific object which is to be supported.

Figure 1:
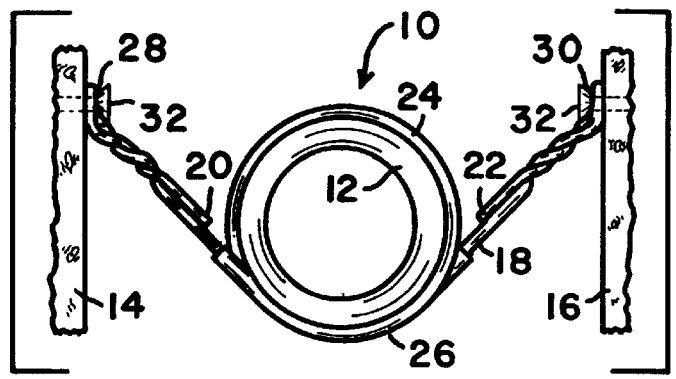
FIG. 1 is substantially a plan view for the present invention and represents the preferred embodiment.

FIG. 1 substantially represents a plan view for our multipurpose fastener (see arrow 10), wherein we show a pipe (12) being supported, or suspended, from a first and a second support structure (14 & 16), such as a support beam, or the like. It is to be further understood that fastener (arrow 10) allows an object, such as pipe (12) to be supported or suspended in a secure manner but does not limit all motion of the object, thus pipe (12) is allowed to partially move.

Therefore, the present fastener is very advantageous when used as a means to provide seismic bracing, which is common practice when installing plumbing, or the like. The present fastener provides additional advantages when used within the plumbing field. For example, when our fastener is used to support a pipe (12), typical stress points and pipe loading as normally encountered is substantially alleviated or reduced. Furthermore, dielectric separation is provided, and sound attenuation is reduced. Also, heat and cold transfer is minimized, etc. Each of these problems must be addressed and recognized within the plumbing field, and therefore it is believed by the applicants that the present fastener is ideal when used in the plumbing industry, or within any field wherein the above problems may be addressed.

Figure 2:
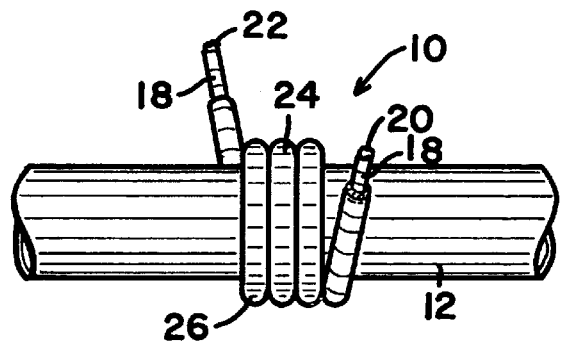
FIG. 2 is substantially a partial left side view of FIG. 1, and drawn to a different scale.

FIGS. 1 & 2, represent the preferred embodiment for fastener (arrow 10), wherein we show a fastener comprising in combination a wire (18) and an insulating removable member (26). Wire (18) can be made of any suitable material of choice, such as metal, stainless steel, etc., and wire (18) is continuous having a first end (20), a second end (22), and substantially a mid-section or central portion (24), and is of any suitable length of user choice. However, wire (18) must be of a sufficient length to easily completely encircle and capture pipe (12) at least one complete revolution (as shown in FIG. 1) or multiple revolutions (as shown in FIG. 2) therein, while still allowing ends (20 & 22) sufficient length to be attached to support structures (14 & 16).

Insulating member (26) is made of substantially any suitable non-metallic material of choice, such neoprene, or the like. However, rubber or plastic tubing is most efficient and preferred. Insulating member (26) is of a shape and size to removably receive and substantially capture wire (18) therein, with wire (18) having its first and second ends (20 & 22) substantially exposed. Thus, insulating member (26) is of a length substantially less than wire (18) and insulating member (26) is of a sufficient length to completely wrap and surround the outside circumference of pipe (12) at least once. It is to be noted that insulating member (26) may be longer so as to completely wrap and surround the outside circumference of pipe (12) multiple times, depending on user choice.

Ends (20 & 22) include any suitable attachment means of choice, which may be used to attach the fastener to a single support structure, or to multiple different support structures such as (14 & 16), depending on user choice. For example ends (20 & 22) may each be bent over upon themselves and twisted, thus forming substantially a first loop (28) and a second loop (30) with each loop (28 & 30) being of a size and shape to receive an attachment member of choice there through, such as nail (32) or the like.

It will now be seen that our fastener when installed, cooperates with pipe (12) and support structure(s) (14 & 16) to suspend or support pipe (12) in a secure manner, without restricting complete movement.

Other embodiments are depicted within FIGS. 3–8 and are only examples of various uses for the present fastener but the invention is not to be limited to these embodiments.

Figure 3:
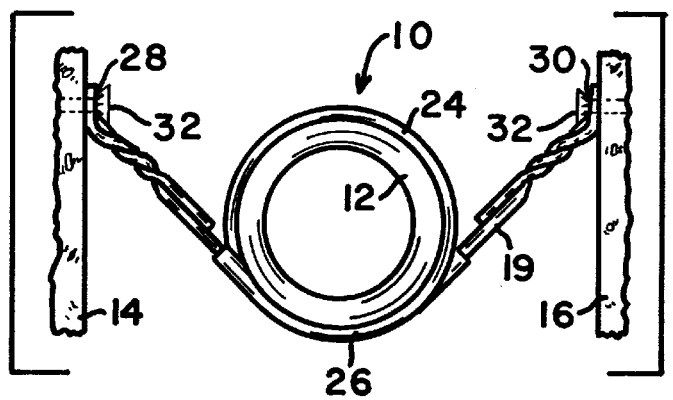
FIG. 3 is substantially a plan view for a second embodiment for the present invention.
Figure 4:
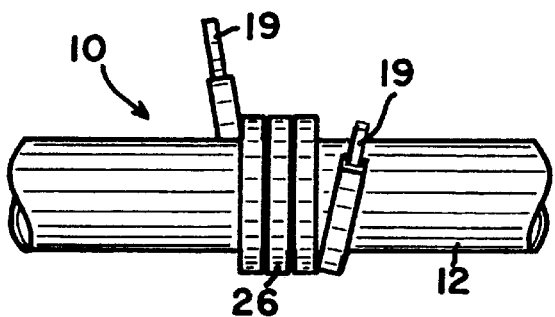
FIG. 4 is substantially a partial left side view of FIG 3, and drawn to a different scale.

A second embodiment is shown within FIGS. 3 & 4, wherein the fastener is substantially the same as FIGS. 1 & 2, however, we now replace wire (18) with a metal strap (19).

A third embodiment is shown in FIG. 5, wherein we show a first wire (34) and a second wire (36), with the first wire (34) having a first end (38) and a second end (40), and the second wire (36) having a first end (42) and a second end (44). Therefore, wires (34 & 36) can be interconnected and fastened together by twisting one wire (34) around the second wire (36), whereby ends (38 & 42) are now positioned and opposed to ends (40 & 44). It is to be noted this connecting means provides improved strength and the fastener is now formed from two interconnected wires (34 &

36). It is to be further noted that ends (38 & 40) include attachment means (30) (as shown in FIG. 1) as previously described. Also, FIG. 5 includes insulating member (26) as previously described. Whereby, FIG. 5 represents a stronger fastener comprised of two wires (34 & 36) and insulating member (26).

FIG. 6 is an example of the embodiment of FIG. 1, however, we further include additional wires (46 & 48), which provide improved strength, thus the fastener comprises in combination three wires (18, 46 & 48), and insulation member (26). It is to be noted insulation member (26) may be attached to any one of the wires (18, 46 or 48) separately or in combination by any suitable attachment means of choice. For example, in FIG. 1, insulation member (26) is slidably engaged around wire (18). While in FIG. 6, insulation member (26) includes an elongated slit (50) which allows either one wire, or multiple wires to be easily inserted lengthwise into insulation member (26) and thus held in a firm manner.

FIG. 7 is also an example of the embodiment of FIG. 1, however, we now show a first wire (52) having first and second ends (56 & 58), and a second wire (54) having first and second ends (60 & 62) and all of the ends include attachment means (30) not shown. This embodiment also provides improved strength.

Referring now to FIGS. 8–12, wherein we show an elongated metal strip (64), which can be of any suitable length of choice and further includes a first and a second slit (66 & 68). Also, strip (64) can be of any suitable gauge of metal of choice, such as 20 gauge. It is to be noted that slits (66 & 68) are of a shape and size to form legs (70), and the legs can be bent in any suitable direction of choice, thus providing attachment means for attaching strip (64) to a support structure of choice, such as (14 or 16) or both.

Figure 12:
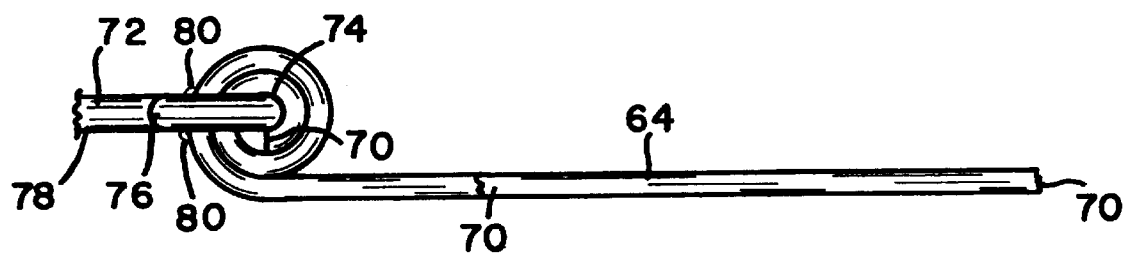
FIG. 12 is substantially a side view of FIG. 11.

Within FIGS. 11 & 12, we further provide means to attach the legs (70) to a wire (72), and any suitable attachment means of choice may be used. However, the applicants prefer the attachment means to be formed by a leg (70) which when partially rolled forms substantially a hollow cavity (74) which is of a shape and size to accept wire (72) there through. Wire (74) includes a first end (76) and a second end (78). When first end (76) is inserted into and through cavity (74) it is of a sufficient length to be bent and wrapped around until end (76) is substantially positioned on an exterior surface of rolled leg (70), and end (76) is then fixedly attached in place by any suitable attachment means of choice, such as by welding (80). It will now be seen that this type of attachment means allows the user to easily attach a wire (72) or multiple wires to substantially any or all of the legs (70), depending on user choice. Therefore providing adjustment means as well, as wire (72) can be any length of choice, and thus it is adjustable. Furthermore, wire (72) can be inserted into cavity (74) from any direction of choice. Whereby, wire (72) or multiple wires may be attached in various configurations, such as positioned side-by-side, opposed to each other, or any combination of choice. Also, cavity (74) is adjustable as well, as its size depends on how tightly or loosely leg (70) is rolled. This also allows substantially any suitable sized wire (72) of choice to be used.

Figure 13:
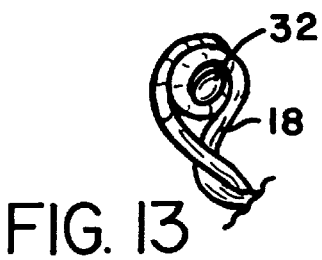
FIG. 13 is substantially a partial perspective view.

Referring now to FIG. 13, wherein we show substantially wire (18) being twisted so as to form substantially multiple loops (82) which provide increased strength when wire (18) is fixedly attached to a support surface (not shown) by nail (32), or the like. It is to be noted that substantially any number of loops may be made depending on user choice, as various advantages are achieved by different configurations of loops (82).

Figure 14:
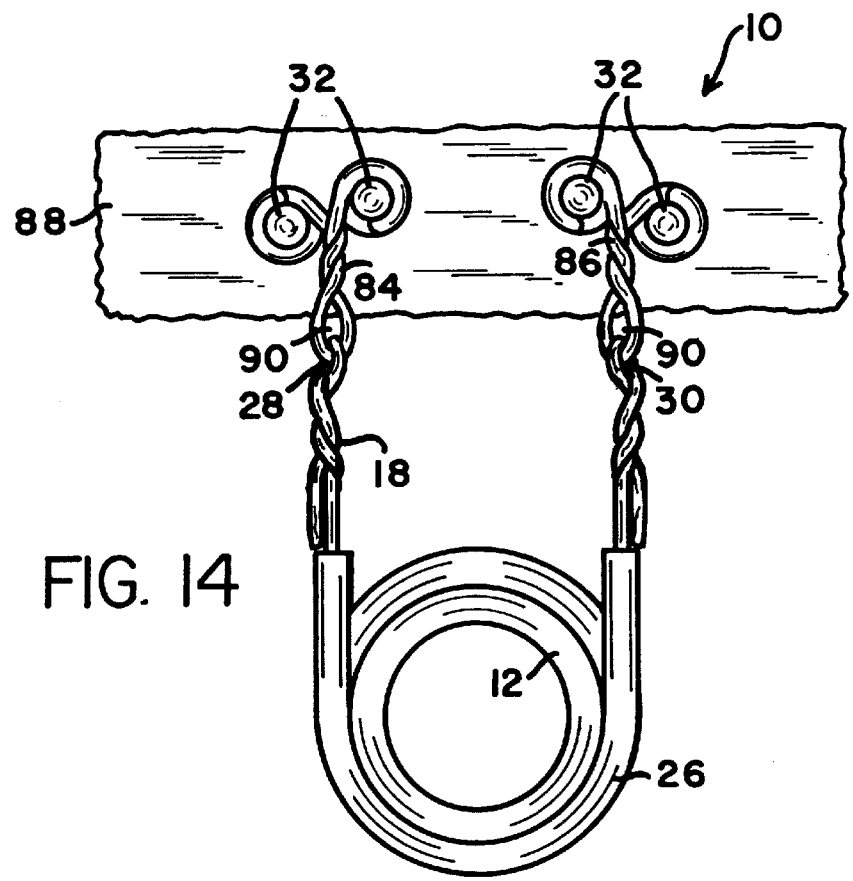
FIG. 14 is substantially a plan view.

Referring now to FIG. 14 which substantially exemplifies a different means to attach the preferred embodiment to a support structure (88). Wherein, we include additional wires (84 & 86) which provide adjustment and attachment means for varying applied tension on wire (18). It is to be noted that wires (84 & 86) may be attached to wire (18) by any suitable means of choice. Such as by either wire (84 or 86) being threadably inserted through substantially either loop (28 or 30) and the ends thereof being pulled until they are substantially aligned. The ends are then twisted around each other and substantially attached to the support structure (88) by any suitable means of choice, such as by nails (32), or the like. Thereafter, further tension may easily be applied, such as by inserting a tool, (such as typically known as a scratch-all tool) into loop (90) and then wires (18 & 84 or 18 & 86) are again twisted until the desired tension is applied, and then the tool is removed.

It is to be noted that within FIG. 8, we also provide a second embodiment for insulation member (26) which is substantially the same as the insulation member of FIG. 1, however, we now form member (26) into substantially an elongated rectangle (72). Again insulation member (26 or 72) may include an elongated slit (50) so as to allow strip (64) to be easily removably inserted lengthwise within member (64).

It is to be further noted that we also provide a method of use as follows:

A method for supporting a pipe from a support structure including the use of a fastener, with the fastener comprising a wire having a first end, a second end and substantially a central portion, and insulation means substantially surrounding the central portion. With the method including the following steps:

a. cutting a piece of wire to the desired length;
b. inserting the wire into the insulation until the insulation is positioned on the wire at the location of choice;
c. positioning substantially the center of both the wire and insulation on top of the pipe;
d. wrapping the pipe with the wire and insulation until the wire and insulation completely surround the pipe;
e. twisting each exposed end of the wire so as to form an attachment means, such as a loop, or multiple loops; and
f. attaching each loop to the support structure at a location of choice.

It is to be understood that each embodiment as disclosed herein includes slightly different method steps, such as the embodiment of FIG. 5, which further includes the use of a second wire, and interconnecting the first wire with the second wire. While the embodiments of FIGS. 6 & 7, include the use of multiple wires. The embodiment of FIGS. 7–10, include elimination of the wires and an elongated metal strip replaces the wire. Furthermore, the insulation as shown in FIGS. 1 & 8 require the insulation to be either slidably engaged or inserted into a slit formed within the insulation.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described our invention, what we claim as new and desire to secure by LETTERS PATENT is:

1. A multipurpose fastener for supporting or suspending an object from a support structure comprising: in combination a wire; and an insulating removable member; said wire having a first end, a second end, and a mid-section, said insulating member being of a shape and size to removably receive and capture said wire therein, said first end and said second end of said wire being exposed, said insulating member being of a sufficient length to completely wrap and surround the outside circumference of said object at least once, and said first end and said second end each having attachment means for attaching said fastener to said support structure, said attachment means comprising: said first end being bent over upon itself and twisted forming a first loop, said second end being bent over upon itself and twisted forming a second loop, and each said loop being of a size and shape to receive an attachment member there through for attaching each said loop to said support structure, whereby:
said fastener and said support structure in combination cooperate together to suspend or support said object in a secure manner without restricting complete movement.

2. A multipurpose fastener for supporting or suspending an object from a support structure comprising: in combination a wire; and an insulating removable member; said wire having a first end, a second end, and a mid-section, said insulating member being of a shape and size to removably receive and capture said wire therein, said first end and said second end of said wire being exposed, said insulating member being of a sufficient length to completely wrap and surround the outside circumference of said object at least once, said first end and said second end each having attachment means for attaching said fastener to said support structure, said attachment means comprising: said first end being bent over upon itself and twisted forming a first loop, said second end being bent over upon itself and twisted forming a second loop, said first loop being of a shape and size to slidably receive a first wire there through, said first wire having aligned ends which when twisted around each other form multiple loops, said ends being fixedly attached to said support structure, said second loop being of a shape and size to slidably receive a second wire there through, said second wire having aligned ends which when twisted around each other form multiple loops, and last said aligned ends are fixedly attached to said support structure, whereby;
said fastener is adjustable by inserting a tool into one of said multiple loops, then said tool is rotated until said fastener is positioned at the desired height.

3. A multipurpose fastener for supporting or suspending an object from a first support structure and a second support structure, said fastener comprising: in combination a wire; and an insulating removable member; said wire having a first end, a second end, and a mid-section, said insulating member being of a shape and size to removably receive and capture said wire therein, said first end and said second end of said wire being exposed, said insulating member being of a sufficient length to completely wrap and surround the outside circumference of said object at least once, said first end having attachment means for attaching said first end of said wire to said first support structure, said second end having attachment means for attaching said second end of said wire to said second support structure, said attachment means for attaching said first end of said wire to said first support structure comprising: said first end being bent over upon itself and twisted forming a first loop, said first loop being of a size and shape to receive an attachment member there through for attaching said first loop to said first support structure, said attachment means for attaching said second end of said wire to said second support structure of a size and shape to receive an attachment member there through for attaching said second loop to said second support structure, whereby:
said fastener, said first support structure, and said second support structure in combination cooperate together to suspend or support said object in a secure manner without restricting complete movement.

4. A multipurpose fastener for supporting or suspending an object from a support structure comprising: in combination a first wire; a second wire; and an insulating removable member, said first wire having a first end and a second end, said second wire having a first end and a second end, each said wire being fastened together by twisting said first wire around said second wire, said first end of said first wire and said first end of said second wire are opposed to said second end of said first wire and said second end of said second wire, said insulating member being of a shape and size to removably receive and capture each said wire therein, said second end of each said wire being exposed, said insulating member being of a sufficient length to completely wrap and surround the outside circumference of said object at least once, said first end and said second end of said first wire each having attachment means for attaching said fastener to said support structure, said attachment means comprising: said first end being bent over upon itself and twisted forming a first loop, said second end being bent over upon itself and twisted forming a second loop, and each said loop being of a size and shape to receive an attachment member there through for attaching each said loop to said support structure, whereby:
said fastener and said support structure in combination cooperate together to suspend or support said object in a secure manner without restricting complete movement.

5. A multipurpose fastener for supporting or suspending an object from a support structure comprising: in combination an elongated metal strip; and an insulating removable member; said strip having a first and a second slit which form multiple legs; said insulating member being of a shape and size to removably receive and capture said strip therein with said legs being exposed, said insulating member being of a sufficient length to completely wrap and surround the outside circumference of said object at least once, said legs each having attachment means for attaching said fastener to said support structure, said attachment means comprising: at least one of said legs being partially rolled which forms a hollow cavity, said cavity being of a shape and size to slidably accept a wire there through, said wire having a first end and a second end, said first end being inserted into said cavity then bent and wrapped around said leg and fixedly attached in place, and said second end of said wire is attachable to said support structure.

6. A method of supporting an object from a support structure in a secure manner without restricting complete movement of said object using a multipurpose fastener comprising of the following steps:

a. cutting a piece of wire to a desired length;
b. inserting said wire into an insulating member until said insulation member is positioned on said wire at the location of choice;
c. positioning the center of both said wire and said insulation on top of said object;
d. wrapping said object with said wire with attached said insulation until said wire and said insulation completely surround said object;
e. twisting each exposed end of said wire so as to form a loop, and;
f. attaching said loop to said support structure.

* * * * *